R. C. PLEINS.
SEAL LOCK.
APPLICATION FILED MAY 18, 1912.
1,066,650.
Patented July 8, 1913.
2 SHEETS—SHEET 1.
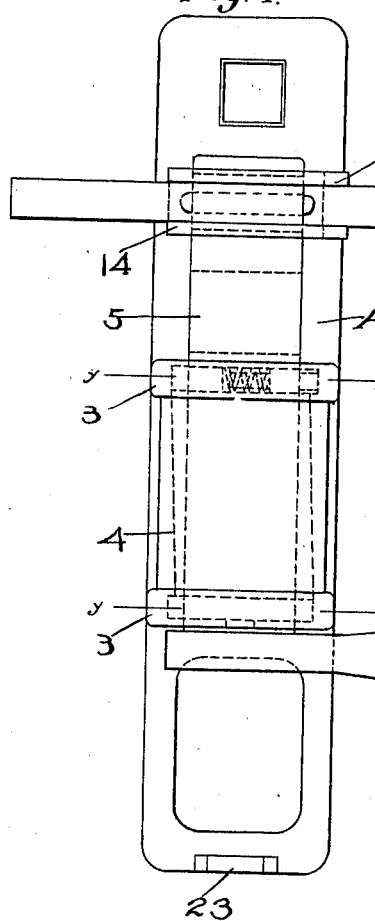
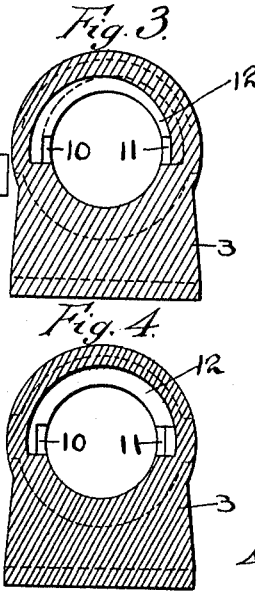
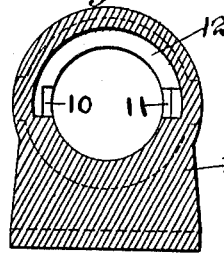
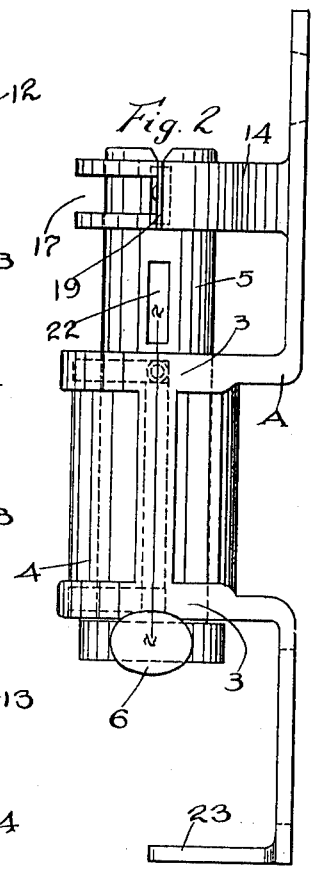
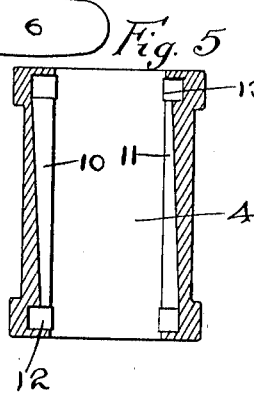
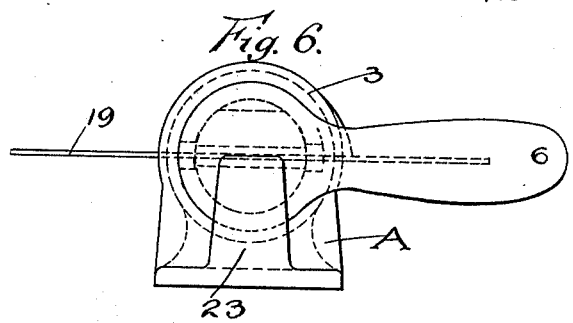
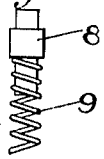
WITNESSES
INVENTOR
Rudolph C. Pleins
by Lathrop Johnson
his Attorneys.

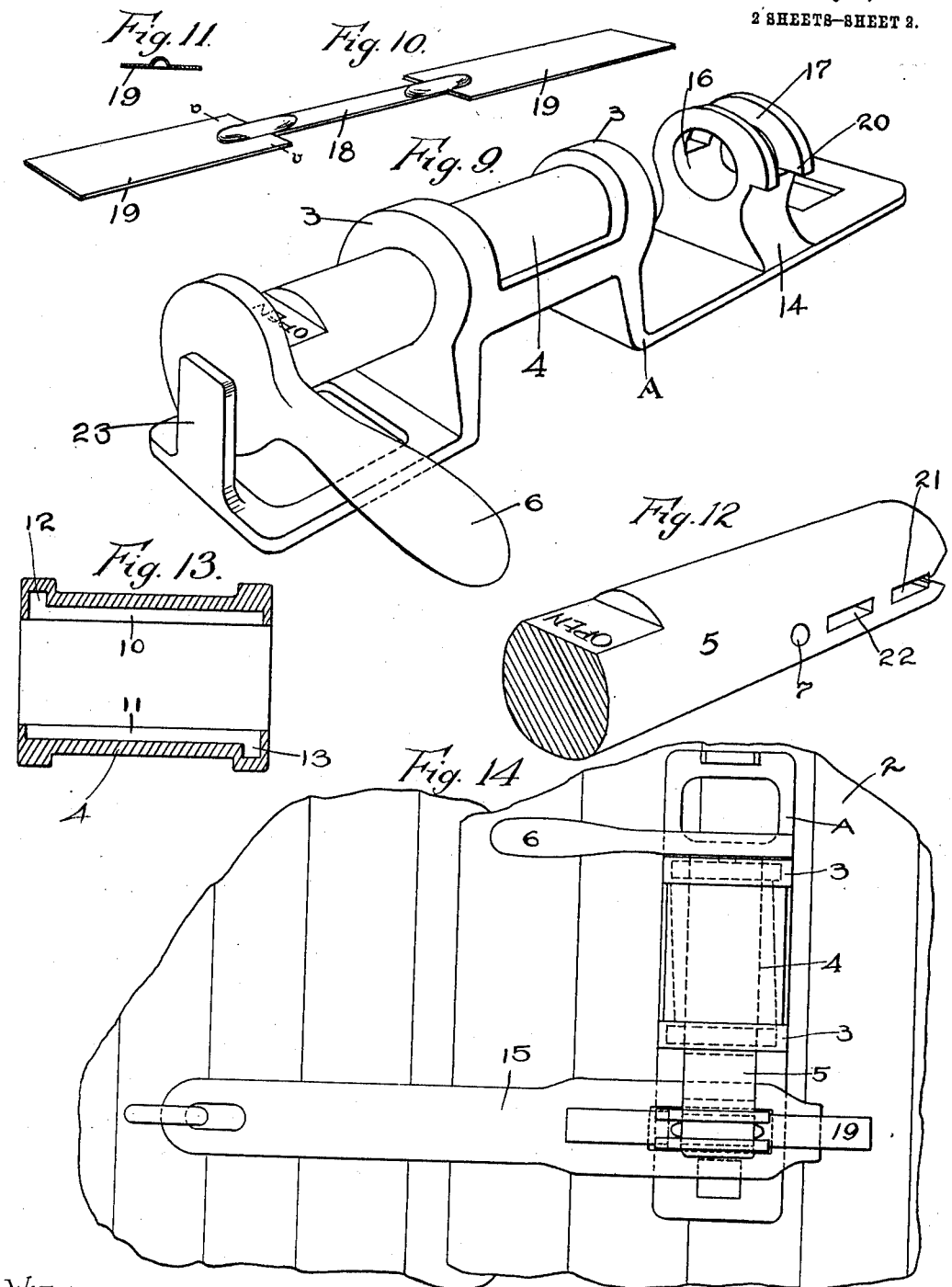

UNITED STATES PATENT OFFICE.

RUDOLPH C. PLEINS, OF ST. PAUL, MINNESOTA.

SEAL-LOCK.

1,066,650.

Specification of Letters Patent.   Patented July 8, 1913.

Application filed May 18, 1912.   Serial No. 698,318.

*To all whom it may concern:*

Be it known that I, RUDOLPH C. PLEINS, a citizen of the United States, residing at St. Paul, in the county of Ramsey and State of Minnesota, have invented certain new and useful Improvements in Seal-Locks, of which the following is a specification.

My invention relates to improvements in seal locks designed particularly for use in securing the doors of freight cars in which the seal must be broken before the door can be opened, its object being particularly to provide improved means for supporting a metal strip seal and for effectively breaking the same.

To this end the invention consists in the features of construction, combination, and arrangement of parts hereinafter described and claimed.

In the accompanying drawings forming part of this specification, Figure 1 is a plan view of my improved lock; Fig. 2 is a side elevation of the same; Fig. 3 is a section on either of the lines *y—y* of Fig. 1 with the locking bolt removed; Fig. 4 is a similar view showing an alternative construction of locking groove forming part of my lock; Fig. 5 is a section on line *z—z* of Fig. 2; Fig. 6 is an end view of the lock; Figs. 7 and 8 are detail views of a locking pin forming part of my invention; Fig. 9 is a perspective view of the lock; Fig. 10 is a perspective view of my improved coöperating seal; Fig. 11 is a section on lines *v—v* of Fig. 10; Fig. 12 is a perspective view of a portion of a locking bolt forming part of my invention; Fig. 13 is a similar view of Fig. 5 showing an alternative form of groove for the locking pin; and Fig. 14 is an elevation of part of a car door showing my device applied thereto.

Referring to the drawings, A represents the frame of my improved lock adapted to be suitably secured to the side 2 of the car. Projecting outwardly from the back plate of the frame are flanges 3 connected by a hollow interiorly cylindrical casing 4 forming a housing for the locking bolt 5. The bolt is slidably rotatable within the housing and formed upon one end with a handle 6. Slidably supported in an opening 7 in one side of the locking bolt is a pin 8 normally held pressed out by a coil spring 9. Formed in the inner wall of the housing are longitudinally extending side grooves 10 and 11 connected at opposite ends by transverse grooves 12 and 13 extending around the upper half of the inner wall of the housing. Figs. 3, 4, 5, and 13 illustrate best the alternative manner of cutting the grooves 10 to 13. In Figs. 4 and 5 the grooves 12 and 13 are of uniform depth, the groove 10 being cut on an incline from the bottom of the groove 13 to a higher point upon the groove 12 making a drop from the end of the groove 10 to the groove 12. The longitudinal groove 11 is oppositely cut to make a drop into the groove 13. In the construction shown in Fig. 3 the grooves 12 and 13 are eccentrically cut with the longitudinal grooves 10 and 11 of even depth. There will thus in each construction be a drop from the groove 10 to the groove 12 and from the groove 11 to the groove 13. Thus with the locking bolt turned to hold the handle in the position shown in Fig. 9 and the bolt withdrawn, the locking pin will stand in the end of the groove 12 adjacent to the longitudinal groove 11. As the locking bolt is then shoved directly forward the pin will travel the length of the groove 11 and drop into the groove 13, the spring forcing the pin outward into locking position in the groove 13. The bolt is then held from withdrawal until it is rotated a complete half circle which rotation will bring the locking pin to the opposite end of the groove 13. The bolt may then be withdrawn, the pin traveling in the groove 10, and at the end thereof dropping into the transverse groove 12. In this withdrawn position the bolt is locked from being shoved inward and must be rotated to the position shown in Fig. 9 before it can be shoved in.

Supported upon the bottom plate of the frame adjacent to the inner end of the bolt is the keeper 14 over which the ordinary hasp 15 is adapted to be slipped, the keeper being formed with an opening 16 to receive the end of the bolt. The keeper is also formed with a top transverse opening 17 to receive the centrally contracted neck 18 of the sealing strip 19. The keeper is formed upon one side with shoulders 20 under which the sealing strip adjacent to the neck 18 will fit, to form a breaking abutment for the seal, as hereinafter more particularly pointed out. The locking bolt at its inner end is formed with a transverse slot or opening 21 to register with the opening 17 in the keeper when the parts are in position shown in Figs. 1 and 2. The bolt may also be formed as shown with a second opening 22 to receive an ordinary seal where desired. The bolt supporting frame may be provided at the end opposite to the keeper with a suitable flange 23 forming a stop limiting the outward movement of the bolt.

In operation, the sealing strip 19 will first be supported by the keeper with the contracted neck of the strip lying in the bottom of the opening 17 which will be directly across the center of the bolt opening. The bolt may then be shoved forwardly to extend through the opening 16 which will cause the neck 18 of the strip to enter the seal opening 21 in the end of the bolt. The free ends of the strip may then be secured together in the ordinary manner. As heretofore described the bolt when shoved forward into sealing position will be held against withdrawal by reason of the spring pressed pin having dropped into the relatively deeper end of the transverse groove 13. When it is desired to break the seal the bolt will be given a half rotation which will break the neck portion of the seal away from the remainder by reason of the sealing strip at one end of the neck being carried into breaking contact with the lower wall of the opening 17 and at the other end of the neck being brought into breaking contact with the shoulders 20. The rotating of the bolt to break the seal will bring the locking pin into the relatively shallow end of the groove 13 allowing the bolt to be withdrawn.

Where it is desired to use an ordinary seal with my device the same may be placed through the opening 22 and suitably secured as by being carried around the keeper and under the projecting end of the bolt. It will be evident that by my coöperating construction of locking device and sealing strip I secure a construction in which an ordinary sealing strip of even width cannot be utilized in substitution of the special strip.

I claim as my invention:

1. In a sealing device of the class described, the combination with a bolt support, of a bolt longitudinally and rotatably movable in said support, said support being interiorly formed with longitudinal side slots and connecting transverse slots, one end of each transverse slot being relatively deeper than the adjacent end of the connected horizontal slot, and a spring pressed pin supported in said bolt and projecting into said slots, said bolt being formed at one end with a seal supporting opening.

2. A sealing device of the class described, comprising in combination a bolt support, a bolt longitudinally and rotatably movable in said support, said bolt being formed at one end with a slot to receive a sealing strip and said support being interiorly formed with longitudinally extending grooves and connecting transverse grooves, one of said transverse grooves being relatively deeper than the adjacent end of the connected longitudinal groove, and a seal supporting keeper formed with a bolt receiving opening in alinement with the bolt receiving opening of said support.

3. In a sealing device of the class described, the combination of a bolt support, a bolt longitudinally and rotatably movable in said support, said bolt being formed in one end with a slot to receive a sealing strip, a sealing strip formed with a contracted neck, and a keeper formed with an opening to receive said neck and thereby support said strip, said keeper being also formed with an opening to receive one end of said locking bolt and allow the neck of said sealing strip to enter the slot in the end of said bolt.

4. A sealing device of the class described, comprising in combination a bolt support, a bolt longitudinally and rotatably movable in said support, said bolt being formed at one end with a slot to receive a sealing strip, a sealing strip formed with a contracted neck, a keeper formed with an opening to receive said neck and support said seal, and also an opening to receive one end of said locking bolt and allow said locking bolt to be shoved into locking engagement with said sealing strip, and means carried by said keeper forming contacts against which said sealing strip may be broken as said bolt is rotated in said keeper.

In testimony whereof I affix my signature in presence of two witnesses.

RUDOLPH C. PLEINS.

Witnesses:
 H. SMITH,
 H. S. JOHNSON.